United States Patent
Lawrence

[11] Patent Number: 5,911,437
[45] Date of Patent: Jun. 15, 1999

[54] TRAILER APPARATUS AND METHOD

[76] Inventor: David L. Lawrence, P.O. Box 1193, Melbourne, Ark. 72556

[21] Appl. No.: 08/700,296

[22] Filed: Aug. 20, 1996

[51] Int. Cl.$^6$ .................................................. B60S 9/04
[52] U.S. Cl. ....................................... 280/766.1; 254/419
[58] Field of Search ............................ 280/425.1, 763.1, 280/764.1, 765.1, 766.1; 254/418, 419, 423, 424, 425, 427; 74/377

[56] References Cited

U.S. PATENT DOCUMENTS

| | | | |
|---|---|---|---|
| 1,953,687 | 4/1934 | Neidinger et al. | 254/425 |
| 2,082,033 | 6/1937 | Seyferth et al. | 254/419 |
| 2,885,900 | 5/1959 | Wormley et al. | 74/377 |
| 2,959,395 | 11/1960 | Strack et al. | 254/419 |
| 3,177,664 | 4/1965 | Konkle | 60/51 |
| 3,402,915 | 9/1968 | Dalton | 254/419 |
| 3,729,212 | 4/1973 | Claflin et al. | 280/766.1 |
| 4,103,869 | 8/1978 | Mesny et al. | 254/425 |
| 4,345,779 | 8/1982 | Busby | 280/766 |
| 4,400,986 | 8/1983 | Swanson et al. | 74/128 |
| 4,402,526 | 9/1983 | Huetsch | 280/766.1 |
| 4,466,637 | 8/1984 | Nelson | 254/419 |
| 4,993,688 | 2/1991 | Mueller et al. | 254/423 |
| 5,050,845 | 9/1991 | Aline | 254/419 |
| 5,100,105 | 3/1992 | Schneider et al. | 254/93 |
| 5,299,829 | 4/1994 | Rivers, Jr. et al. | 280/766.1 |
| 5,401,046 | 3/1995 | Schwartz et al. | 280/425.1 |
| 5,426,961 | 6/1995 | Rimbaud et al. | 280/763.1 |
| 5,509,687 | 4/1996 | Thorndike | 280/763.1 |

FOREIGN PATENT DOCUMENTS

| | | | |
|---|---|---|---|
| 706288 | 3/1965 | Canada | 280/766.1 |
| 2006379 | 12/1970 | Germany | 280/766.1 |

*Primary Examiner*—J. J. Swann
*Assistant Examiner*—Frank Vanaman
*Attorney, Agent, or Firm*—Head, Johnson & Kachigian

[57] ABSTRACT

Trailer apparatus or drive unit is disclosed for rotating a drive shaft of a trailer landing gear, lifting gear, dolly, or the like, thereby facilitating the raising and lowering of the legs or supports of the landing gear. The drive unit includes a shaft and gear assembly or gear box having a first shaft with one end adapted to be releasably connected to the drive shaft of the landing gear and with a second end adapted to receive a hand crank handle, a second shaft parallel to the first shaft with one end serving as a rotary support and the other end adapted to receive an output shaft of a rotary motor. A first gear is attached to the first shaft proximate its ends with a plurality of drive teeth meshing with corresponding drive teeth of a second smaller gear attached to the second shaft proximate its ends. A housing surrounds the gears, supports the shafts and includes openings for receiving therethrough the first and second shafts. A rotary motor, such as an impact motor or an air impact wrench motor, is attached to the housing with the output shaft of the rotary motor received by the other end of the second shaft. The rotary motor is driven in forward or reverse rotation to rotate the second shaft which in turn causes rotation of the first shaft which is operatively connected to the drive shaft of the landing gear and thereby causes rotation of the drive shaft of the landing gear and raising or lowering of the legs thereof.

19 Claims, 4 Drawing Sheets

TRAILER APPARATUS AND METHOD

BACKGROUND OF THE INVENTION

The present invention relates to a trailer landing gear, lifting gear, dolly, or the like, drive units, gear boxes, rotary motors, improved trailers, drive adapters, and landing gear systems, components and methods. More particularly, the present invention is directed to an improved trailer landing gear apparatus and method including a shaft and gear assembly adapted to be attached to a drive shaft of a landing gear and driven by a rotary motor or a hand crank.

A conventional trailer landing gear, lifting gear, dolly, or the like, includes a pair of spaced landing gear legs and feet which extend downwardly from the floor of the trailer and are operatively attached to screw and follower or a rack and pinion gear arrangement driven by a landing gear drive shaft which extends between the legs and which causes extension or retraction of the legs and feet depending on the direction in which it is rotated. Typically, a hand crank handle is attached to the landing gear drive shaft by a pin or bolt which serves as a hinge connection allowing the handle to be pivoted out of the way while not in use. Manual rotation of the handle in one direction causes extension of the feet and lifting of the trailer to, for example, separate the trailer from a semi-tractor, and requires considerable time and effort on the part of the person manually rotating the hand crank.

Attempts have been made to reduce the effort required to manually operate the crank handle, for example, a two-speed gear box has been added to the landing gear to allow the hand crank handle to be attached to either a high speed or low speed input shaft of the gear box.

Further, power-operated actuators have been provided to rotate the landing gear drive shaft in either direction in order to extend or retract the landing gear feet automatically rather than manually. Such power-operated actuators are described for example in U.S. Pat. Nos. 4,345,779, 4,400,986, 4,402,526, 5,050,845, and 5,299,829.

U.S. Pat. No. 4,345,779 discloses a drive mechanism for a vehicle trailer lifting gear including a rotary drive unit driven by air under pressure supplied from the vehicle and having a drive socket engaging a nut welded to a shaft of the trailer lifting gear assembly. U.S. Pat. Nos. 4,400,986 and 4,402,526 disclose a landing gear actuator adapted to be connected to the crank shaft of the landing gear of a semi-trailer. The crank shaft is rotated by gears and ratchets which are driven by pawls reciprocated by an air actuated cylinder unit.

U.S. Pat. No. 5,050,845 discloses a pneumatic lift system for raising and lowering the landing gear of a trailer including a pneumatic motor supported by the landing gear. A gear shaft spline assembly is provided between the speed reducer that is coupled to the pneumatic motor and the crankshaft that drives the landing gear high-low gear reduction assembly. The spline assembly permits the crankshaft to axially translate and shift gear arrangements in the gear reduction assembly without separating the crankshaft from the pneumatic drive.

U.S. Pat. No. 5,050,845 mentions other pneumatic drives used to operate landing gear for trailers and which include air motor drives which drive a transmission that in turn drives the existing conventional landing gear shaft. Pressurized air is taken from the existing brake line to drive the motor. A valve is positioned between the brake line and the motor to control the rotational direction of the motor as well as to turn the motor on and off. Generally these pneumatic systems have been designed to be mounted to the undercarriage of the trailer body. While these designs permit the pneumatic system to be mounted to a flat bed type trailer, they are not suitable for mounting to trailers not having a flat bed, such as trailers having a cylindrical body or tank.

U.S. Pat. No. 5,299,829 appears to disclose one of the pneumatic systems for automatic operation of the semi-trailer landing gear as described in U.S. Pat. No. 5,050,845.

Examples of hydraulic, pneumatic, or hydro-pneumatic cylinder type trailer lifting systems are described in U.S. Pat. Nos. 3,177,664, 4,993,688, 5,100,105, and 5,401,046.

The above described power actuators or hydraulic and pneumatic lift systems suffer from the drawbacks of being overly complicated, expensive, difficult to use, lack versatility in placement, do not provide for manual as well as automatic raising or lowering of the landing gear, are not portable or adapted for easy attachment or detachment from conventional landing gear drive shafts, and/or the like.

Hence, there exists a need for an improved trailer apparatus, landing gear, lifting gear, dolly, or the like, drive unit, gear box, rotary motor, trailer, drive adapter, system, component and/or methods.

SUMMARY OF THE INVENTION

In accordance with the present invention, at least one embodiment of the trailer apparatus and method addresses the drawbacks of the prior art and is directed to an improved drive unit for rotating a drive shaft of a trailer landing gear, lifting gear, dolly, or the like, thereby facilitating the raising and lowering of the legs or supports of the landing gear and the resultant raising and lowering of at least one end of the trailer. The drive unit includes a shaft and gear assembly or gear box having a first shaft with one end adapted to be connected to the drive shaft of the landing gear and with a second end adapted to receive a hand crank handle, a second shaft parallel to the first shaft with one end serving as a rotary support and the other end adapted to receive an output shaft of a reversible rotary motor. A first gear is attached to the first shaft proximate its ends with a plurality of drive teeth meshing with corresponding drive teeth of a second smaller gear attached to the second shaft proximate its ends. A housing or cover surrounds the gears, supports the shafts and includes a first opening for receiving therethrough the first end of the first shaft, a second opening receiving therethrough the second end of the first shaft, and a third opening receiving therethrough the other end of the second shaft.

A rotary motor, such as an impact motor or an air impact wrench motor, is attached to the housing with the output shaft of the rotary motor received by the other end of the second shaft. The rotary motor is driven in forward or reverse rotation to rotate the second shaft which in turn causes rotation of the first shaft which is operatively connected to the drive shaft of the landing gear and thereby causes rotation of the drive shaft of the landing gear and raising or lowering of the landing gear legs.

In accordance with another embodiment of the present invention, an improved gear box or shaft and gear assembly for use with a trailer landing gear, lifting gear, dolly, or the like, includes a first shaft with a first end adapted to be operatively connected to the drive shaft of the landing gear and with a second end adapted to receive a hand crank handle, a second shaft parallel to the first shaft and having one end serving as a rotary support and the other end adapted to receive the output shaft of a rotary motor, respective gears attached to each shaft and having intermeshing gear teeth, a housing receiving and supporting the gears and shafts and serving as a fluid tight container for receiving a friction reducing fluid such as transmission fluid.

In accordance with still another embodiment of the present invention, an improved trailer includes a conventional landing gear, lifting gear, dolly, or the like, modified to include the above described drive unit, gear box, or shaft and gear assembly.

In accordance with still yet another embodiment of the present invention, an improved trailer landing gear includes the above described drive unit, gear box, or shaft and gear assembly.

In accordance with another aspect of the present invention, an adapter or gear box is provided for operatively connecting an air motor to the drive shaft of the trailer landing gear. An exemplary adapter of this kind includes a shaft having a receiving socket at one end adapted to be attached to the drive shaft of the landing gear and an opposing receiving socket at the other end adapted to receive the splined output shaft of an air motor. In accordance with another exemplary embodiment, the adapter includes the above described shaft and gear assembly or gear box.

In accordance with but another embodiment of the present invention, a portable drive unit including the above described shaft and gear assembly or gear box and an air motor is releasably and operatively attached to the drive shaft of a landing gear by a removable or releasable pin or bolt so that the drive unit can be used on site to raise or lower the legs of the landing gear as necessary and removed from the trailer to prevent theft or to allow for use with other trailers.

In accordance with still another exemplary embodiment of the present invention, a fixed drive unit for rotating the drive shaft of a trailer landing gear, lifting gear, dolly, or the like, includes a shaft and gear assembly or gear box attached to the outer sleeve of the landing gear and an air motor attached to the shaft and gear assembly.

A principle object of the present invention is the provision of an improved trailer apparatus, landing gear, lifting gear, dolly, or the like, drive unit, gear box, rotary motor, adapter, system, component, method and/or the like.

Another object of the present invention is the provision of an improved trailer apparatus which is relatively inexpensive, eloquently simple in design, easy to use, versatile, removable, replaceable, or the like.

A still further object of the present invention is the provision of a drive unit, device or system for rotating a drive shaft of a trailer landing gear, lifting gear, dolly, or the like.

A still further object of the present invention is the provision of a gear box for attachment to a drive shaft of a trailer landing gear, lifting gear, dolly, or the like.

Yet another object of the present invention is the provision of an adapter for operatively connecting an air motor to the drive shaft of a trailer landing gear, lifting gear, dolly, or the like.

Still another object of the present invention is the provision of a method of raising or lowering the legs of a trailer landing gear, lifting gear, dolly, or the like, using the improved trailer apparatus, drive unit, adapter, or gear box of the present invention.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENTS

Figure 1:
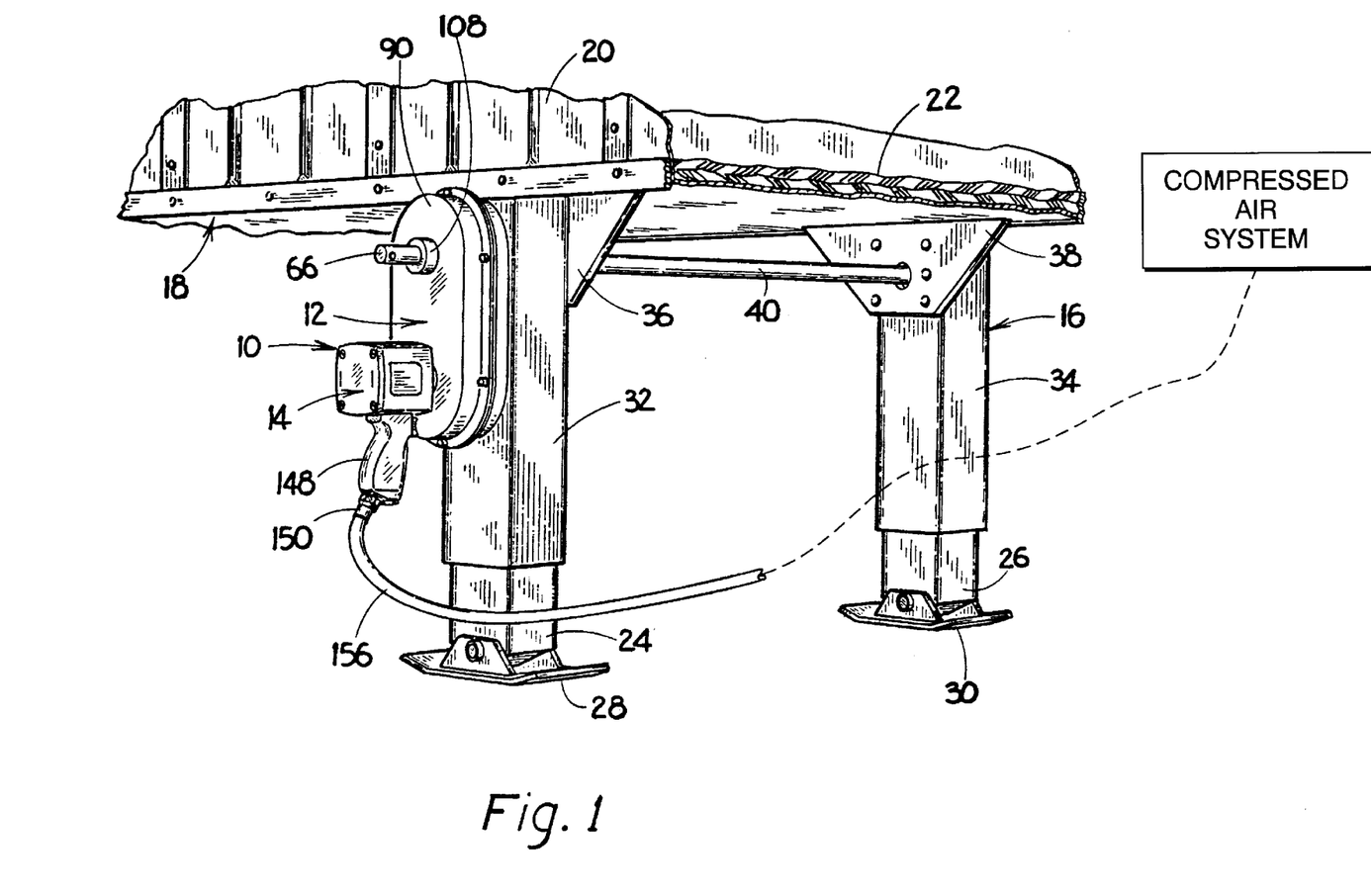
FIG. 1 is a perspective view illustration of an exemplary embodiment of a trailer landing gear drive unit of the present invention operatively attached to a trailer landing gear.
Figure 2:
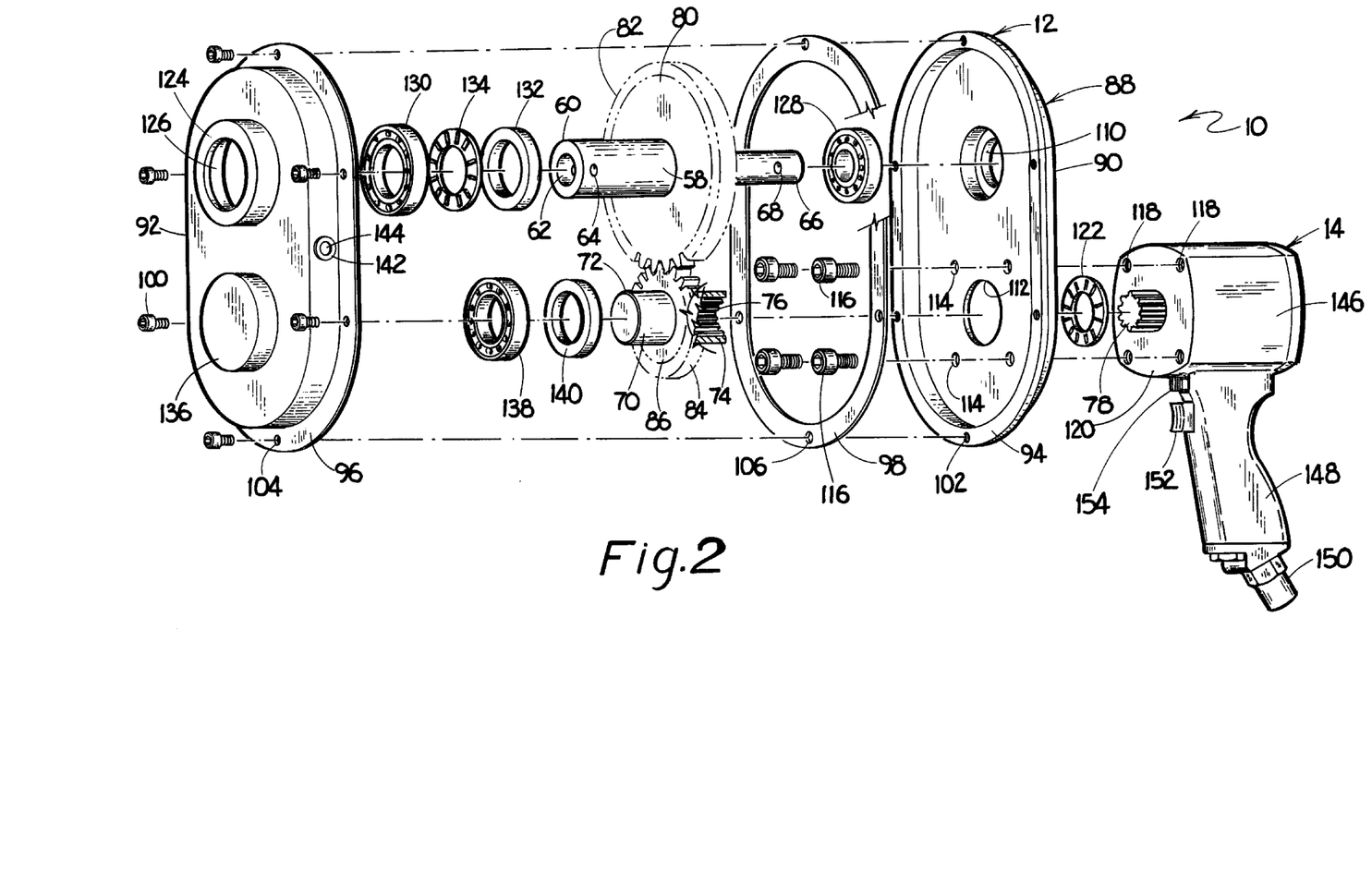
FIG. 2 is an exploded perspective view representation of the drive unit of FIG. 1 with the parts separated to show the relationship of parts and order of assembly of the various parts.
Figure 3:
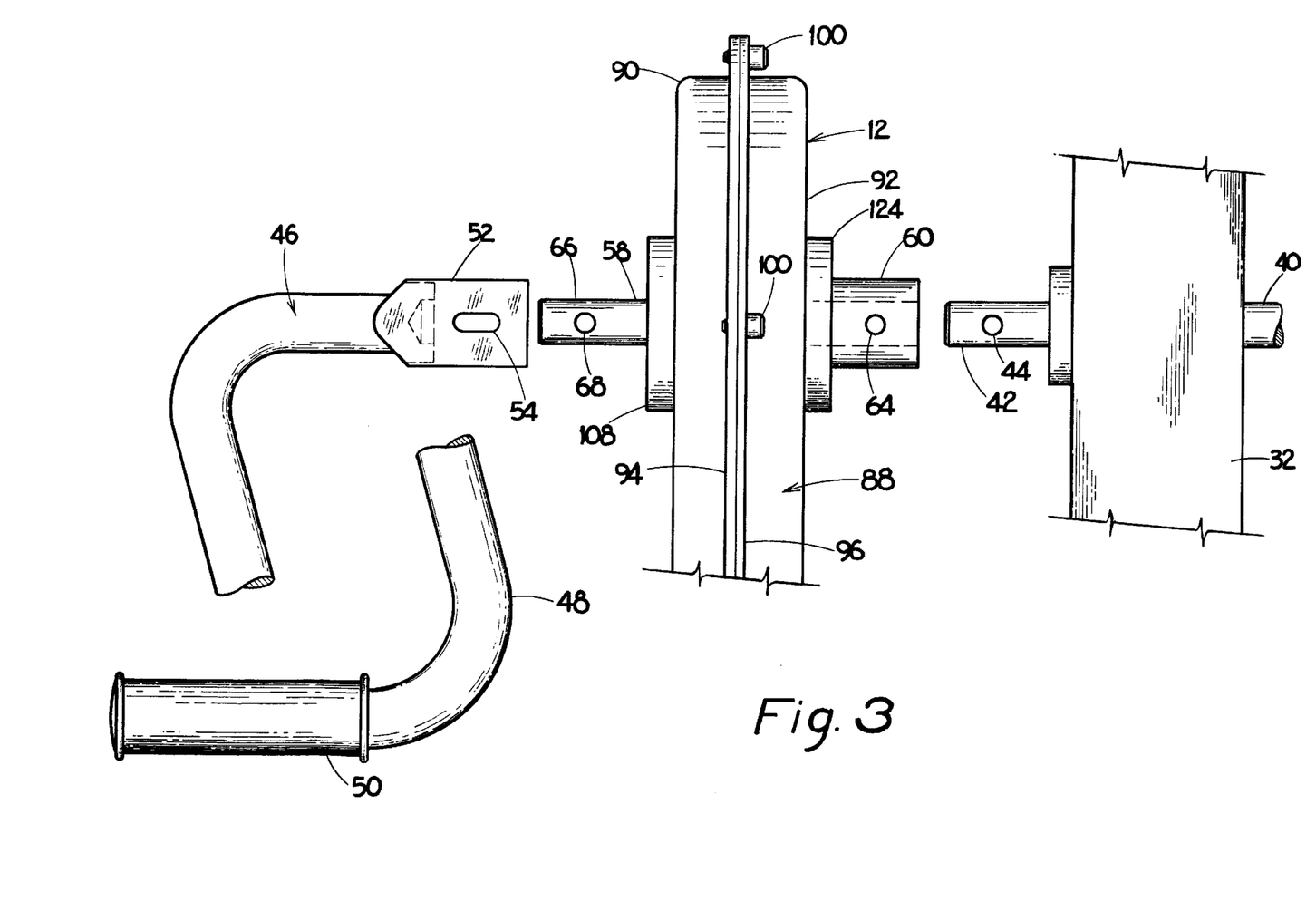
FIG. 3 is a partial front plan view illustration with the drive unit of FIG. 1 separated from the landing gear drive shaft and a hand crank handle.

In accordance with an exemplary embodiment of the present invention as shown in FIGS. 1–3 of the drawings, a drive unit generally designated by the reference numeral 10 includes a shaft and gear assembly or gear box 12 and a rotary motor 14. The drive unit 10 is operatively connected to or attached to a landing gear, lifting gear, dolly, or the like 16, which forms part of a trailer 18. Although the trailer 18 is shown to have vertical sidewalls 20 and a horizontal floor 22, it is to be understood that the drive unit 10 of the present invention finds equal applicability to other trailer arrangements including flat bed, tanker, bottom dump, etc.

The landing gear, lifting gear, dolly, or the like 16, is of conventional construction and includes right and left legs 24 and 26 having pivotally mounted feet, wheels or pads 28 and 30 at the lower end thereof. The upper end of each of the legs 24 and 26 is telescopically received within a rectangular sleeve 32 and 34, respectively. Each of the sleeves 32 and 34 is attached to the bottom of the trailer 18 by a respective vertical bracket 36 and 38. Each of the sleeves 32 and 34 and the brackets 36 and 38 include corresponding circular openings for receiving a landing gear drive shaft 40 therethrough. Within each of the sleeves 32 and 34 are respective screw and follower or rack and pinion gear mechanisms for raising or lowering each of the legs 24 and 26 in response to clockwise or counterclockwise rotation of the shaft 40.

With particular reference to FIG. 3 of the drawings, shaft 40 has an end 42 which extends outwardly from sleeve 32 and has a transverse circular opening 44 extending completely through the shaft 40. The shaft end 42 and opening 44 provide an operative male coupling member for attaching a conventional manual crank handle 46 thereto with a pin or bolt having an outer diameter slightly less than the diameter of the opening 44. For example, a ¼ inch diameter steel bolt and lock nut. The manual crank handle 46 includes an elongate bent shaft 48, a hand grip 50 and a pair of spaced vertical plates 52 having a circular opening or slot 54 therein. The slots 54 are adapted to receive the pin or bolt which provides a releasable and pivotable connection between the handle 46 and shaft 40.

With reference again to FIGS. 1 and 3 of the drawings, although the landing gear 16 is shown to include a shaft end 42 extending through sleeve 32, it is to be understood that a conventional landing gear, lifting gear, dolly, or the like, for trailers especially trailers adapted to be towed behind semi-tractors may include a two-speed gear box or gear reducer box on the outer surface of sleeve 32. Such a gear box or gear reducer may provide an additional operative male coupling including a cylindrical stub shaft and a transverse circular opening of like dimension to that of shaft end 42 and opening 44 of shaft 40. The crank handle 46 is adapted to be attached to either the male coupling member of shaft 40 or of a two-speed gear box or gear reducer box. Likewise, the drive unit 10 of the present invention is adapted to be attached to the end 42 of shaft 40 or the input shaft of a conventional two-speed gear box or gear reducer.

The shaft and gear assembly or gear box 12 of the drive unit 10 of the present invention, includes a first shaft 58 having a first end 60 including a central circular opening 62 adapted to receive the end 42 of drive shaft 40 of landing gear 16. Further, the end 60 includes a transverse circular opening 64 corresponding to the opening 44 in shaft end 42. Thus, the end 60 of first shaft 58 of the gear box 12 can be permanently or releasably attached to the end 42 of landing gear drive shaft 40 by a pin, bolt, rod, or the like, placed through openings 64 and 44 and either being removable such as having a removable nut, retaining clip, cotter key, or the like, or being nonremovable, permanent, or tamper resistant by being welded in place or having the nut welded thereto.

First shaft 58 has a second end 66 with a transverse circular opening 68 therethrough. It is preferred that shaft end 66 and opening 68 be dimensioned the same as or similar to the dimensions of shaft end 42 and opening 44 of landing gear drive shaft 40. This allows the shaft end 66 of shaft 58 to serve as the male coupling member for attachment of a conventional manual crank handle 46 thereto. Hence, the shaft and gear assembly 12 is adapted to be driven by either a rotary motor 14 or a manual crank handle 46.

The shaft and gear assembly 12 includes a second shaft 70 parallel to the first shaft 58 and having one end 72 serving as a rotary support and another end 74 having a splined female recess 76 adapted to receive a corresponding splined output shaft 78 of rotary motor 10. A first gear 80 is attached to or keyed to first shaft 58 proximate its ends 60 and 66 with a plurality of drive teeth 82 positioned to mesh with corresponding drive teeth 84 of a second smaller gear 86 attached to or keyed to the second shaft 70 proximate its ends 72 and 74.

Shaft and gear assembly 12 further includes a housing or cover 88 made up of housing sections or casings 90 and 92 each having like sized oval cavities with corresponding circumferential flanges 94 and 96 which are joined together to form a fluid tight housing or container by a gasket or seal 98 and a plurality of threaded fasteners or bolts 100 each of which are received in respective openings 102, 104 and 106 in the housing sections and gasket, respectively.

The housing section 90 has a cylindrical flange 108 extending outwardly therefrom and having a central circular opening 110 therein adapted to receive end 66 of shaft 58 therethrough. Housing section 90 further includes a second circular opening 112 adapted to receive the end 74 of second shaft 70 therethrough. Opening 112 is surrounded by four symmetrically spaced smaller circular openings 114 each adapted to receive a respective threaded fastener or set screw 116 having a threaded shaft which passes through the opening 114 in housing 90 and into a respective internally threaded opening 118 in face 120 of air motor 10 for attaching the air motor 14 to the housing 88 with a thrust washer 122 between the air motor face 120 and shaft 70.

Housing section 92 includes a first cylindrical flange 124 extending outwardly therefrom and having a circular central opening 126 adapted to receive the end 60 of shaft 58 therethrough. Shaft 58 is journalled in the respective annular seal bearings 128 and 130 with an annular spacer 132 and a thrust washer 134 between the bearing 130 and gear 80.

Housing section 92 further includes a closed cylindrical flange 136 adapted to receive an annular seal bearing 138 for rotatably journalling the end 72 of shaft 70. An annular spacer or ring 140 is placed between the bearing 138 and the gear 86 on shaft 70.

Still further, at least one of the housing sections 90 and 92 includes a fill opening 142 and a filler plug or cap 144 for adding a friction reducing fluid such as transmission fluid to the interior of the housing 88 to prevent wear and reduce heat during operation of the drive unit 10.

The rotary motor 14 shown in the exemplary embodiment of FIGS. 1 and 2 of the drawings, is an air motor, impact motor, air impact wrench motor, or the like, for example, a Century Pneumatic Corporation ¾ inch air motor having a ⁹⁄₁₆ inch diameter drive shaft with 13 teeth or splines, reversible, operating at air pressures of 90 to 120 lbs. per square inch (psi), with the drive chuck removed to expose the splined drive shaft.

The rotary motor 14 includes a motor body 146, a handle 148, a hose quick disconnect 150, a trigger 152, and a forward and reverse rotation direction lever or switch 154. The quick disconnect 150 is adapted to receive an air pressure hose 156 such as a compressed air hose of a truck cab or semi-tractor which provides air at about 100 to 125 lbs. per square inch (psi).

Figure 4:
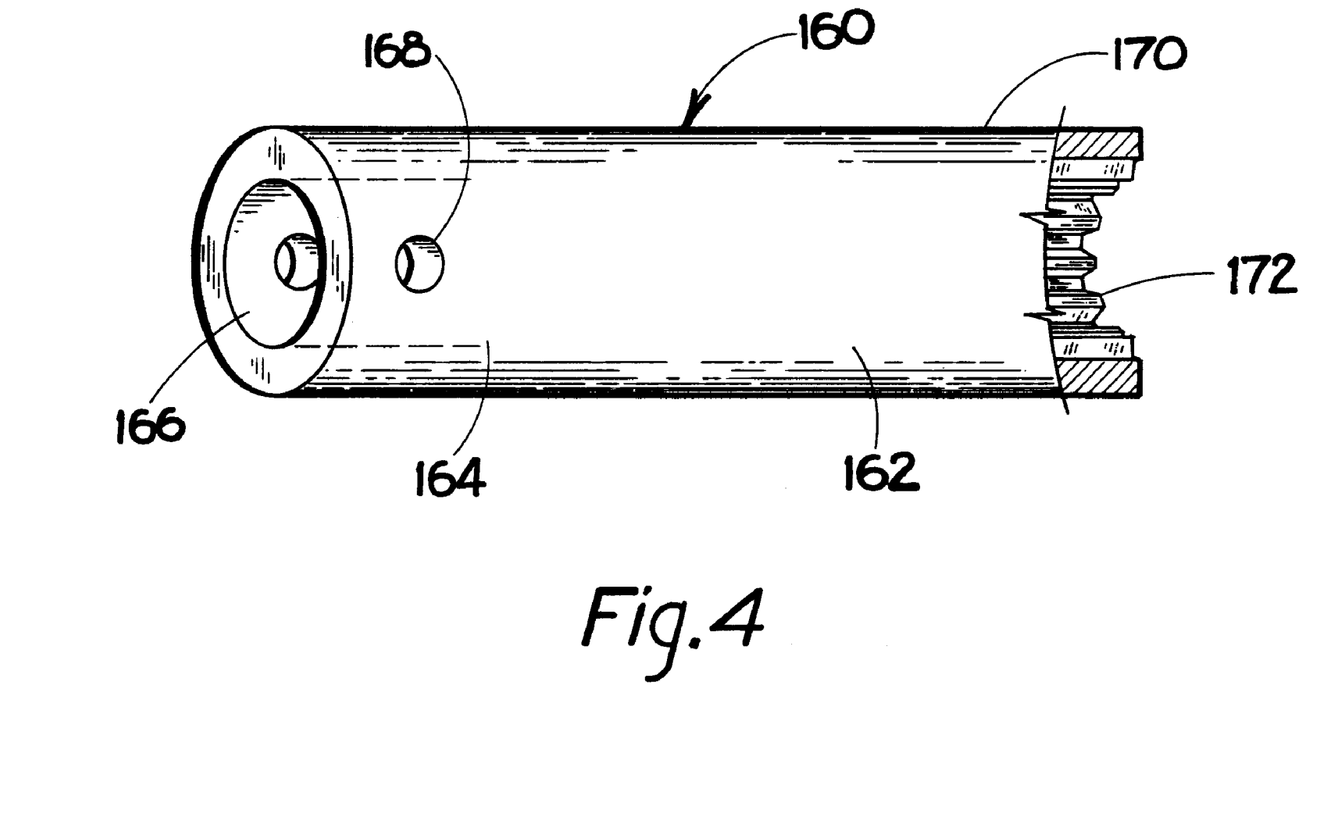
FIG. 4 is a perspective view representation of an adapter for operatively connecting an air motor to the drive shaft of a trailer landing gear or the drive unit of FIG. 1 in accordance with yet another embodiment of the present invention.

As shown in FIG. 4 of the drawings, an adapter generally designated 160 includes an elongate shaft 162 having a first end 164 with a circular central opening 166 and a smaller diameter transverse circular opening 168 therethrough. The openings 166 and 168 of end 164 correspond to the openings 62 and 64 of end 60 of shaft 58. Consequently, the end 164 of adapter 160 can be releasably or permanently attached to the end 42 of shaft 40 of the landing gear 16, or to the end 66 of shaft 58 using a pin, peg, rod, or bolt which passes through openings 168 and 44 or 168 and 68. Shaft 162 has a second end 170 which includes a central splined recess 172 adapted to receive the splined output shaft 78 of motor 14. Thus, the adapter 160 can be used to directly attached the air motor 14 to the landing gear drive shaft 40 or to the drive unit first shaft 58.

The adapter 160 of FIG. 4 can be used to add two air motors to the drive unit 10, to use a supplemental air motor for the drive unit 10 in place of the air motor 14, or as a replacement for the shaft and gear assembly or gear box 12 if, for example, the gear box 12 is disabled, is not available, or is unnecessary.

Although it is preferred that the drive motor 14 be attached to the shaft and gear assembly 12, it is contemplated that the screws 116 and openings 114 can be eliminated and the air motor 14 is portable.

Similarly, although it is preferred that the entire drive unit 10 including shaft and gear assembly 12 and air motor 14 be portable, it is envisioned that one could bolt or strap the shaft and gear assembly 12 to the sleeve 32 of landing gear 16.

Additionally, although it is preferred to use an impact motor, air motor, impact wrench motor, or the like, it is contemplated that other rotary motors providing the necessary drive force, reversibility, and the like, for example, corded or cordless electric drills, pneumatic or hydraulic drills or motors, etc. may be used.

Since the screw openings 114 in housing 90 are symmetrically positioned about opening 112, the air motor 14 can be attached to the housing 90 with the handle 148 pointing downwardly, to either side, or upwardly depending on the circumstance.

The drive unit 10 is designed to work with any trailer with a manual crank for raising or lowering the legs or supports of a landing gear, lifting gear, dolly, or the like. Hence, the drive unit 10 serves as an air driven landing gear or dolly assist which is especially suited for use with a tractor-trailer although it is not limited to this purpose. The conventional hand crank of a tractor-trailer is supplemented or replaced by the drive unit 10 including the air motor 14 operated by compressed air supplied by the tractor (about 100 to 125 lbs. per square inch) and a gear assembly 12 and/or adapter 160 for transferring drive from either the air motor or the conventional crank handle to the trailer landing gear or dolly.

EXAMPLE PARTS LIST

I. Air Motor
A. "Century Pneumatic Corporation" air motor.
B. Drive shaft is 9/16" diameter.
C. Drive shaft 13 teeth splined.
D. Motor is reversible.
E. Operating air pressure is 90 lbs. minimal and 120 lbs. maximum.
F. Other air motors of different manufacturers may be used with matching drive shafts.
II. Housing Casings
A. Dimensions: 12" length×8¼" width
III. Secondary Shaft
A. Dimensions: 1" diameter×10¼" length
B. ⅝" holes bored in each end
 1. Hole bored on sprocket end for connection to dolly system
 2. Hole bored in extended shaft for alternate use for use for manual operation in case of air loss
IV. Main Drive Shaft
A. Dimensions: 1" diameter×4¼" length
B. Air motor end equipped with female 13 teeth spline recess to match with air motor drive shaft splines
V. Main Drive Gear
A. Dimensions: 1⅝" diameter×¾" width
B. 14 teeth sprocket
C. 1" bore
VI. Secondary Drive Sprocket
A. Dimensions: 6" diameter×½" width
B. 61 teeth sprocket
C. 1" bore
VII. Main Drive Spacer
A. Dimensions: ⅝" width Walls: ⅛" thick
B. 1" bore
VIII. Secondary Drive Spacer
A. Dimensions: ¾" width Walls: ⅛" thick
B. 1" bore
IX. Thrust Washers
A. Two thrust washers used in gear box
 1. One used on secondary drive shaft between secondary drive spacer and bearing
 2. Second thrust washer used between air motor and main drive shaft
 3. Dimensions on #1 thrust washer: ⅛" thick Diameter—1½" with 1" bore
 4. Dimensions on #2 thrust washer: ⅛" thick with 1½" diameter. 9/16" bore X. Bearings
A. Three bearings used
 1. Two bearings on secondary shaft One bearing on main drive shaft
 2. All bearings are "NICE"-SKF-38, but cross-reference manufactured bearing may be used.
XI. Air Motor Mounting Bolts
A. 8.8 mm×1¾" (4 used)
B. Note: All four holes in mounting are symmetrical, allowing for rotation of air motor to be used in different position
XII. Housing Case Bolts
A. Six are used
B. ¼×1"
C. Six HEX nuts and lock washers
XIII. Housing gasket: (or permatex) is used to seal the two halves of housing cases
XIV. Filler Plug: Fill casing housing to fill plug with automotive automatic transmission fluid.
A. Plug is ⅜"×½" square-headed plug bolt.

Thus, it will be appreciated that as a result of the present invention, a highly effective, improved trailer apparatus and method is provided by which the principle objective, among others, is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. A portable, removable, drive unit for rotating a drive shaft of a conventional trailer landing gear, lifting gear, or dolly adapted to receive a conventional hand crank thereby facilitating the raising and lowering of legs or supports of the landing gear and the resultant raising and lowering of at least one end of the trailer, comprising:

a self-contained, removable shaft and gear assembly including a first shaft having a first end adapted to be operatively connected to a free end of the drive shaft of the landing gear adapted to receive a conventional hand crank and extending outwardly from at least one side of the landing gear and a second end adapted to receive a hand crank handle, a second shaft parallel to the first shaft and having one end serving as a rotary support and the other end adapted to receive an output shaft of a portable, detachable rotary motor, a first gear attached to said first shaft proximate its ends and having a plurality of drive teeth in position to mesh with corresponding drive teeth of a second smaller gear attached to said second shaft proximate its ends, a first housing having at least one opening receiving said first end of said first shaft therethrough, a second housing attached to said first housing and having at least a first opening receiving said second end of said first shaft therethrough and a second opening receiving said other end of said second shaft therethrough, and bearings for rotatably supporting each of said first and second shafts in said housings, and said portable, detachable rotary motor including said output shaft, means for rotating the output shaft, and control means for causing forward or reverse rotation of said output shaft.

2. The drive unit as recited in claim 1, wherein said rotary motor is selected from the group of pneumatic, hydraulic, and electric motors.

3. The drive unit as recited in claim 1, wherein said rotary motor is an air motor adapted to be connected to a compressed air system of a vehicle which tows the trailer.

4. The drive unit as recited in claim 1, wherein said rotary motor is attached to said second housing.

5. The drive unit as recited in claim 1, wherein said rotary motor is a modified conventional air motor having a drive chuck removed to expose a splined output shaft.

6. The drive unit as recited in claim 5, wherein said modified rotary motor is attached to said second housing by a plurality of symmetrically arranged threaded fasteners which allow the motor to be attached in one of a number of orientations.

7. The drive unit as recited in claim 1, wherein said rotary motor is attached to said second housing in a tamper proof manner preventing easy removal thereof.

8. The drive unit as recited in claim 1, further comprising:
   a fill port for a friction reducing fluid in at least one of said housings, and at least one of gaskets and seals for preventing leakage of said fluid from said housings.

9. The drive unit as recited in claim 1, further comprising:
   quick disconnect means for releasably attaching said first end of said first shaft to the drive shaft of the landing gear.

10. A portable removable, self-contained gear box for use in rotating a conventional drive shaft of a trailer landing gear, lifting gear, or dolly adapted to receive a conventional hand crank thereby facilitating the raising and lowering of legs or supports of the landing gear and the resultant raising and lowering of at least one end of the trailer, comprising:
    a first shaft having a first end adapted to be operatively connected to a free end of the drive shaft of the landing gear adapted to receive a conventional hand crank and extending outwardly from at least one side of the landing gear and a second end adapted to receive a hand crank handle, a second shaft parallel to the first shaft and having one end serving as a rotary support and the other end adapted to receive an output shaft of a rotary motor, a first gear attached to said first shaft proximate its ends and having a plurality of drive teeth in position to mesh with corresponding drive teeth of a second gear attached to said second shaft proximate its ends, a first housing having at least one opening receiving said first end of said first shaft therethrough, a second housing attached to said first housing and having at least a first opening receiving said second end of said first shaft therethrough and a second opening receiving said other end of said second shaft therethrough, and bearings for rotatably supporting each of said first and second shafts in said housings.

11. The gear box as recited in claim 10, further comprising:
    a fill port for a friction reducing fluid in at least one of said housings, and at least one of gaskets and seals for preventing leakage of said fluid.

12. In a trailer having a landing gear, lifting gear, or dolly for raising and lowering at least one end of the trailer, the improvement comprising:
    a self-contained, removable shaft and gear assembly including a first shaft having a first end adapted to be operatively connected to a free end of a drive shaft of the landing gear adapted to receive a conventional hand crank and extending outwardly from at least one side of the landing gear and a second end adapted to receive a hand crank handle, a second shaft parallel to the first shaft and having one end serving as a rotary support and the other end adapted to receive an output shaft of a rotary motor, a first gear attached to said first shaft proximate its ends and having a plurality of drive teeth in position to mesh with corresponding drive teeth of a second gear attached to said second shaft proximate its ends, a first housing having at least one opening receiving said first end of said first shaft therethrough, a second housing attached to said first housing and having at least a first opening receiving said second end of said first shaft therethrough and a second opening receiving said other end of said second shaft therethrough, and bearings for rotatably supporting each of said first and second shafts in said housings.

13. The trailer as recited in claim 12, further comprising:
    said rotary motor including said output shaft, means for rotating the output shaft, and control means for causing forward or reverse rotation of said output shaft.

14. The trailer as recited in claim 13, wherein said rotary motor is an air motor adapted to be connected to a compressed air system of a vehicle which tows the trailer.

15. In a trailer landing gear, lifting gear, or dolly including one or more movable legs or supports for raising and lowering at least one end of the trailer, the improvement comprising:
    a self-contained, removable shaft and gear assembly including a first shaft having a first end adapted to be operatively connected to a free end of a drive shaft of the landing gear adapted to receive a conventional hand crank and extending outwardly from at least one side of the landing gear and a second end adapted to receive a hand crank handle, a second shaft parallel to the first shaft and having one end serving as a rotary support and the other end adapted to receive an output shaft of a rotary motor, a first gear attached to said first shaft proximate its ends and having a plurality of drive teeth in position to mesh with corresponding drive teeth of a second gear attached to said second shaft proximate its ends, a first housing having at least one opening receiving said first end of said first shaft therethrough, a second housing attached to said first housing and having at least a first opening receiving said second end of said first shaft therethrough and a second opening receiving said other end of said second shaft therethrough, and bearings for rotatably supporting each of said first and second shafts in said housings.

16. The landing gear as recited in claim 15, further comprising:
    said rotary motor including said output shaft, means for rotating the output shaft, and control means for causing forward or reverse rotation of said output shaft.

17. The landing gear as recited in claim 16, wherein said rotary motor is an air motor adapted to be connected to a compressed air system of a vehicle which tows the trailer.

18. An adapter for operatively connecting an air motor to a drive shaft of a trailer landing gear, comprising:
    a self-contained, portable shaft and gear assembly including a first shaft having a first end adapted to be operatively connected to a free end of the drive shaft of the landing gear adapted to receive a conventional hand crank and extending outwardly from at least one side of the landing gear and a second end adapted to receive a hand crank handle, a second shaft parallel to the first shaft and having one end serving as a rotary support and the other end adapted to receive an output shaft of a rotary motor, a first gear attached to said first shaft proximate its ends and having a plurality of drive teeth in position to mesh with corresponding drive teeth of a second gear attached to said second shaft proximate its ends, a first housing having at least one opening receiving said first end of said first shaft therethrough, a second housing attached to said first housing and having at least a first opening receiving said second end of said first shaft therethrough and a second opening receiving said other end of said second shaft therethrough, and bearings for rotatably supporting each of said first and second shafts in said housings.

19. A method of raising and lowering legs of a trailer landing gear using a portable, removable drive unit including a self-contained, removable shaft and gear assembly including a first shaft having a first end adapted to be operatively connected to a free end of a drive shaft of the landing gear adapted to receive a conventional hand crank and extending outwardly from at least one side of the landing gear and a second end adapted to receive a hand crank handle, a second shaft parallel to the first shaft and having one end serving as a rotary support and the other end adapted to receive an output shaft of a rotary motor, a first gear attached to said first shaft proximate its ends and having a plurality of drive teeth in position to mesh with corresponding drive teeth of a second gear attached to said second shaft proximate its ends, a first housing having at least one opening receiving said first end of said first shaft therethrough, a second housing attached to said first housing and having at least a first opening receiving said second end of said first shaft therethrough and a second opening receiving said other end of said second shaft therethrough, and bearings for rotatably supporting each of said first and second shafts in said housings, and said rotary motor including said output shaft, means for rotating the output shaft, and control means for causing forward or reverse rotation of said output shaft, comprising the steps of:

attaching the first end of said first shaft to the free end of said drive shaft, placing the output shaft of the rotary motor in the other end of said second shaft, and rotating said second shaft with said rotary motor thereby causing rotation of said drive shaft.

* * * * *